(12) United States Patent
Billing et al.

(10) Patent No.: US 10,371,143 B2
(45) Date of Patent: Aug. 6, 2019

(54) SYSTEM AND METHOD FOR HEALTH DETERMINATION OF A MACHINE COMPONENT

(71) Applicant: Caterpillar Inc., Peoria, IL (US)

(72) Inventors: Andrew W. Billing, Bloomington, IL (US); Brian G. Wheeler, Metamora, IL (US); Michael J. Campagna, Chillicothe, IL (US); Dereck G. Heffron, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 83 days.

(21) Appl. No.: 15/591,990

(22) Filed: May 10, 2017

(65) Prior Publication Data

US 2017/0241414 A1    Aug. 24, 2017

Related U.S. Application Data

(63) Continuation-in-part of application No. 14/307,657, filed on Jun. 18, 2014, now abandoned.

(51) Int. Cl.
*G05B 23/02* (2006.01)
*F04B 51/00* (2006.01)
*F04B 49/10* (2006.01)
*F02M 59/44* (2006.01)

(52) U.S. Cl.
CPC .............. *F04B 51/00* (2013.01); *F04B 49/10* (2013.01); *F02M 59/44* (2013.01); *F04B 2203/0209* (2013.01); *F04B 2205/05* (2013.01); *F04B 2205/11* (2013.01); *F04B 2207/70* (2013.01); *G05B 23/0232* (2013.01)

(58) Field of Classification Search
CPC .................................................. G05B 23/0232
See application file for complete search history.

(56) References Cited

U.S. PATENT DOCUMENTS

| | | | |
|---|---|---|---|
| 5,566,091 A | 10/1996 | Schricker et al. | |
| 6,286,479 B1 | 9/2001 | Cryer et al. | |
| 6,889,656 B1 * | 5/2005 | Rembold | F02D 41/062 123/446 |
| 7,228,210 B2 | 6/2007 | Davis et al. | |

(Continued)

*Primary Examiner* — Jennifer E Simmons
(74) *Attorney, Agent, or Firm* — Leydig, Voit & Mayer, Ltd.

(57) ABSTRACT

A system for determining health of a component is provided. The system includes an operational parameter module associated with the component and in communication with a controller. The controller is configured to receive an operating parameter signal from the operational parameter module. The controller is configured to monitor a change of the operating parameter over a predetermined time period. The controller is configured to compare the monitored operating parameter with a first predetermined threshold. The controller is configured to determine a rate of change of the monitored operating parameter over the predetermined time period. The controller is also configured to compare the determined rate of change with a second predetermined threshold. The controller is further configured to determine the health of the component based, at least in part, on the comparisons with the first and second predetermined thresholds respectively and one or more additional parameters associated with the component.

15 Claims, 5 Drawing Sheets

(56) References Cited

U.S. PATENT DOCUMENTS

| | | |
|---|---|---|
| 7,664,618 B2 | 2/2010 | Cheung et al. |
| 8,600,636 B2 | 12/2013 | Chen et al. |
| 2006/0181427 A1 | 8/2006 | Bouse et al. |
| 2012/0283963 A1 | 11/2012 | Mitchell et al. |

* cited by examiner

SYSTEM AND METHOD FOR HEALTH DETERMINATION OF A MACHINE COMPONENT

CROSS-REFERENCE TO RELATED APPLICATIONS

This patent application is a continuation-in-part of copending U.S. patent application Ser. No. 14/307,657, filed Jun. 18, 2014, which is incorporated by reference.

TECHNICAL FIELD

The present disclosure relates to a diagnostic system, and more specifically to a system and method for determining health of a machine component.

BACKGROUND

A machine component, such as a fuel pump, has an operating life during which the component may provide satisfactory performance. Beyond the operating life, the component may fail or efficiency may reduce due to wear and tear and/or other factors. Currently used diagnosis techniques for predicting a failure of the component monitor an operating temperature of components connected in parallel to the said machine component, in order to predict failure of the machine component.

For example, U.S. Pat. No. 5,566,091, hereinafter referred as the '091 patent, discloses a method for diagnosing degradation and predicting failure of similar machine components operated in parallel. The method includes providing a plurality of similar components with sensor means for producing signals indicative of a level of an operating parameter common to the components. The method includes periodically determining from the signals a difference between the operating parameter level of a first component and the operating parameter level of a second component to generate a differential value. The method also includes averaging one or more differential values over a predefined trend period to generate a corresponding trend value for that period. The method further includes generating a trend based on a plurality of trend values to provide an indication of component performance useful in diagnosing component health.

However, the method disclosed in the '091 patent may provide inaccurate or erroneous results during exceptional behavior characteristics of the machine component such as, for example, a sudden spike in the operating temperature, variation in ambient conditions of operation of the machine component, and so on.

Hence, there is a need for an improved system and method for determining health of the machine component prior to failure.

SUMMARY OF THE DISCLOSURE

In one aspect of the present disclosure, a system for determining health of a component is provided. The system includes an operational parameter module associated with the component. The operational parameter module is configured to generate an operating parameter signal indicative of an operating parameter of the component. The system also includes a controller in communication with the operational parameter module. The controller is configured to receive the operating parameter signal from the operational parameter module. The controller is configured to monitor a change of the operating parameter over a predetermined time period. The controller is configured to compare the monitored operating parameter with a first predetermined threshold. The controller is configured to determine a rate of change of the monitored operating parameter over the predetermined time period. The controller is also configured to compare the determined rate of change with a second predetermined threshold. The controller is further configured to determine the health of the component based, at least in part, on the comparisons with the first and second predetermined thresholds respectively and one or more additional parameters associated with the component.

In another aspect of the present disclosure, a method for determining health of a component is provided. The method includes receiving an operating parameter signal indicative of an operating parameter of the component. The method includes monitoring a change of the operating parameter over a predetermined time period. The method includes comparing the monitored operating parameter with a first predetermined threshold. The method includes determining a rate of change of the monitored operating parameter over the predetermined time period. The method also includes comparing the determined rate of change with a second predetermined threshold. The method further includes determining the health of the component based, at least in part, on the comparisons with the first and second predetermined thresholds respectively and one or more additional parameters associated with the component.

In yet another aspect of the present disclosure, system for determining health of a component is provided. The system includes a means for generating an operating parameter signal indicative of an operating parameter of the component. The system includes a means for receiving the operating parameter signal from an operational parameter module. The system includes a means for monitoring a change of the operating parameter over a predetermined time period. The system includes a means for comparing the monitored operating parameter with a first predetermined threshold. The system includes a means for determining a rate of change of the monitored operating parameter over the predetermined time period. The system also includes a means for comparing the determined rate of change with a second predetermined threshold. The system further includes a means for determining the health of the component based, at least in part, on the comparisons with the first and second predetermined thresholds respectively and one or more additional parameters associated with the component.

Other features and aspects of this disclosure will be apparent from the following description and the accompanying drawings.

DETAILED DESCRIPTION

Figure 1:
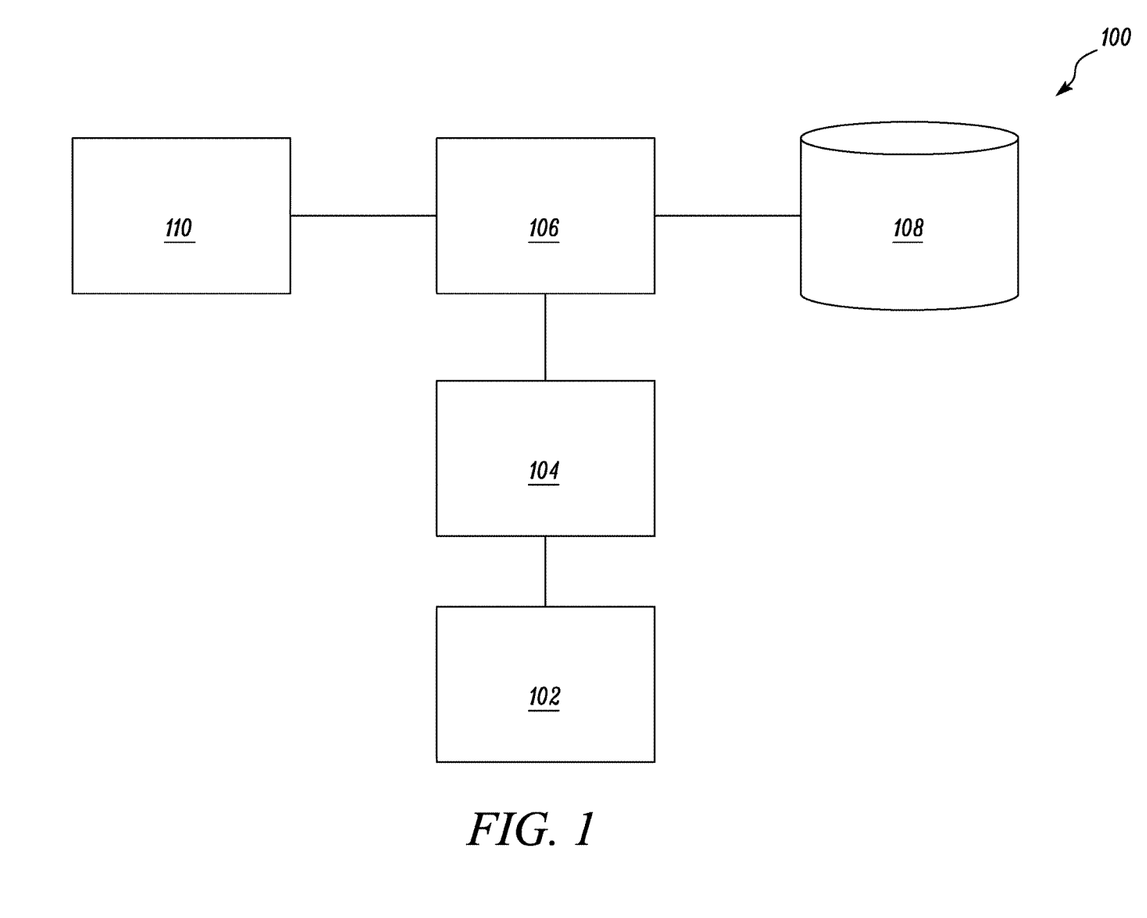
FIG. 1 is a block diagram of an exemplary health determination system, according to one embodiment of the present disclosure.

Wherever possible, the same reference numbers will be used throughout the drawings to refer to the same or the like parts. Referring to FIG. 1, an exemplary block diagram of a health determination system 100 is illustrated. The health determination system 100 is associated with one or more components 102 of a machine (not shown). More specifically, the component 102 may be a fuel pump. The component 102 may be associated with an engine (not shown) of the machine. The machine may be any machine known in the art associated with industries including, but not limited to, construction, transportation, mining, agriculture, forestry, material handling, power generation and waste management. Accordingly, the machine may be a wheel loader, an excavator, a dozer, a paving machine, a mining truck, a generator set and so on.

The health determination system 100 includes a means for generating an operating parameter signal, such as an operational parameter module. The operational parameter module may be a single sensor, a combination of sensors, one or more virtual sensors or a module configured to derive or computationally estimate the operating parameter signal from one or more other signals. The operating parameter signal may be at least one of a temperature signal, a pressure signal, a velocity signal and a load signal indicative of the respective operating parameter of the component 102.

For the purpose of explanation of the disclosure, the operating parameter considered herein is a temperature signal "TS" and the operational parameter module is a temperature sensor 104. It should be noted that, in other embodiments, the operating parameter signal may include the pressure signal, the velocity signal or the load signal and/or a combination thereof without limiting the scope of the disclosure. Accordingly, the operational parameter module may be a pressure sensor, a velocity sensor, or a load sensor respectively.

The health determination system 100 includes the means for generating the temperature signal "TS" such as, the temperature sensor 104. In other embodiments, the means for generating the temperature signal "TS" may include any temperature sensing device such as, for example, a thermocouple, a thermistor, a resistive temperature device, an infrared sensor, a bimetallic device, and so on. In yet other embodiments, the temperature signal "TS" may be derived or computationally estimated from one or more other signals, virtual sensors or engine related parameters such as, but not limited to, engine speed, engine load, and so on. The temperature sensor 104 is communicably coupled to the component 102. The temperature signal "TS" is indicative of an operating temperature "OT" of the component 102.

In other embodiments, the means for generating the temperature signal "TS" may include a first temperature sensor (not shown) and a second temperature sensor (not shown). The first temperature sensor is configured to generate a first temperature signal (not shown) indicative of an operating temperature of an inlet of the component 102. The second temperature sensor is configured to generate a second temperature signal (not shown) indicative of an operating temperature of an outlet of the component 102.

The health determination system 100 includes a means for receiving the temperature signal "TS" from the temperature sensor 104 such as, a controller 106. In other embodiments, the controller 106 may include a product control module, a commercial or third party data acquisition system, a pyrometer and so on. The controller 106 is communicably coupled to the temperature sensor 104. In the embodiment, when the health determination system 100 may include the first and second temperature sensors, the controller 106 is communicably coupled to the first and second temperature sensors. In such a situation, the controller 106 may receive the first and second temperature signals0 from the first and second temperature sensors respectively.

The controller 106 may embody a single microprocessor or multiple microprocessors configured for receiving signals from the components 102 of the health determination system 100. The signals may be in analog and/or digital format. Numerous commercially available microprocessors may be configured to perform the functions of the controller 106. It should be appreciated that the controller 106 may embody a machine microprocessor capable of controlling numerous machine functions. A person of ordinary skill in the art will appreciate that the controller 106 may additionally include other elements and may also perform other functions not described herein. Further, the controller 106 may be located on the component 102, the machine or at a remote location.

The health determination system 100 includes a means for monitoring a change of the operating temperature "OT" over a predetermined time period "T" such as, the controller 106. In other embodiments, the controller 106 may include the product control module, the commercial or third party data acquisition system, the pyrometer and so on. In the embodiment, where the means for generating the temperature signal "TS" may include the first and second temperature sensors, the controller 106 may be configured to monitor a difference between the first and second temperature signals over the predetermined time period "T". The predetermined time period "T" may refer to a predefined time period such as, a period from date/time of installation of the component 102 until current date/time, a period from date/time of last service interval of the component 102 until current date/time and/or any other custom dates/times.

The health determination system 100 includes a means for comparing the monitored operating temperature "OT" with a first predetermined threshold "TH1" such as, the controller 106. In other embodiments, the controller 106 may include the product control module, the commercial or third party data acquisition system, the pyrometer and so on. In the embodiment, where the means for generating the temperature signal "TS" may include the first and second temperature sensors, the controller 106 may be configured to compare the difference between the first and second temperature signals with the first predetermined threshold "TH1". The first predetermined threshold "TH1" may be stored in a database 108 communicably coupled to the controller 106 or a memory (not shown) of the controller 106.

In one embodiment, the controller 106 may refer to a lookup table stored in the database 108 or the memory of the controller 106. In another embodiment, the controller 106 may refer to a reference map stored in the database 108 or the memory of the controller 106. The lookup table and/or the reference map may include values of the first predetermined threshold "TH1" corresponding to one or more additional parameters. The additional parameters may include at least one of a level of fuel in a tank (not shown), an ambient temperature and a type of fuel which will be explained later. In yet another embodiment, the controller 106 may refer to a predefined relationship stored in the database 108 or the memory of the controller 106. The predefined relationship may be a predetermined mathematical equation. The mathematical equation may include a multiple polynomial regression model, a physics based model, a neural network model or any other model or algorithm or a combination thereof known in the art.

The health determination system 100 includes a means for determining a rate of change of the monitored operating temperature "OT" over the predetermined time period "T" such as, the controller 106. In other embodiments, the controller 106 may include the product control module, the commercial or third party data acquisition system, the pyrometer and so on. In the embodiment, where the means for generating the temperature signal "TS" may include the first and second temperature sensors, the controller 106 may be configured to determine a rate of change of the difference between the first and second temperature signals over the predetermined time period "T".

The health determination system 100 includes a means for comparing the determined rate of change with a second predetermined threshold "TH2" such as, the controller 106. In other embodiments, the controller 106 may include the product control module, the commercial or third party data acquisition system, the pyrometer and so on. In the embodiment, where the means for generating the temperature signal "TS" may include the first and second temperature sensors, the controller 106 may be configured to compare the determined rate of change of the difference between the first and second temperature signals with the second predetermined threshold "TH2". The second predetermined threshold "TH2" may be stored in the database 108 communicably coupled to the controller 106 or the memory (not shown) of the controller 106.

In one embodiment, the controller 106 may refer to the lookup table stored in the database 108 or the memory of the controller 106. In another embodiment, the controller 106 may refer to the reference map stored in the database 108 or the memory of the controller 106. The lookup table and/or the reference map may include values of the second predetermined threshold "TH2" corresponding to one or more additional parameters. The additional parameters may include at least one of the level of fuel in the tank, the ambient temperature and the type of fuel which will be explained later. In yet another embodiment, the controller 106 may refer to the predefined relationship stored in the database 108 or the memory of the controller 106. The predefined relationship may be the predetermined mathematical equation. The mathematical equation may include the multiple polynomial regression model, the physics based model, the neural network model or any other model or algorithm or a combination thereof known in the art. It should be noted that the first and second predetermined thresholds "TH1", "TH2" are absolute values stored in the database 108 or the memory of the controller 106. Further, the first and second predetermined thresholds "TH1", "TH2" may be modified by an operator based on system design and requirements.

The health determination system 100 also includes a means for determining the health of the component 102 such as, the controller 106. In other embodiments, the controller 106 may include the product control module, the commercial or third party data acquisition system, the pyrometer and so on. In the illustrated embodiment, the controller 106 is configured to determine the health of the component 102 based, at least in part, on the comparisons with the first and second predetermined thresholds "TH1", "TH2" respectively and the one or more additional parameters associated with the component 102.

Figure 2:
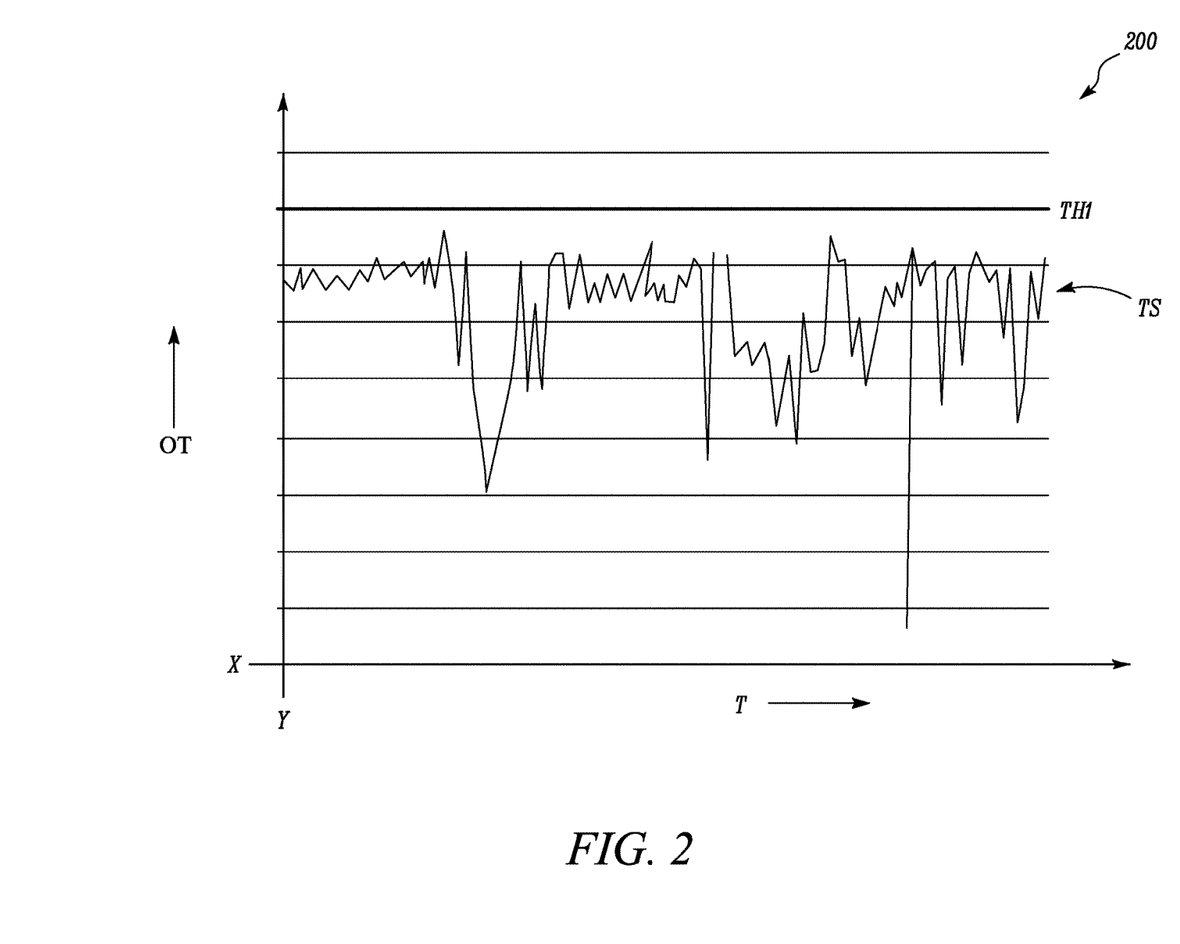
FIGS. 2 to 4 are graphs showing exemplary variations of an operating temperature of a component over a predetermined time period, according to various embodiments of the present disclosure.

Referring to FIG. 2, a graph 200 showing an exemplary variation of the operating temperature "OT" of the component 102 over the predetermined time period "T" is illustrated. As shown, the operating temperature "OT" of the component 102 over the predetermined time period "T" is lower than the first predetermined threshold "TH1". Also, the rate of change of the monitored operating temperature "OT" (not shown) over the predetermined time period "T" is lower than the second predetermined threshold "TH2" (not shown). In such a situation, the controller 106 is configured to determine a healthy status of the component 102.

Figure 3:
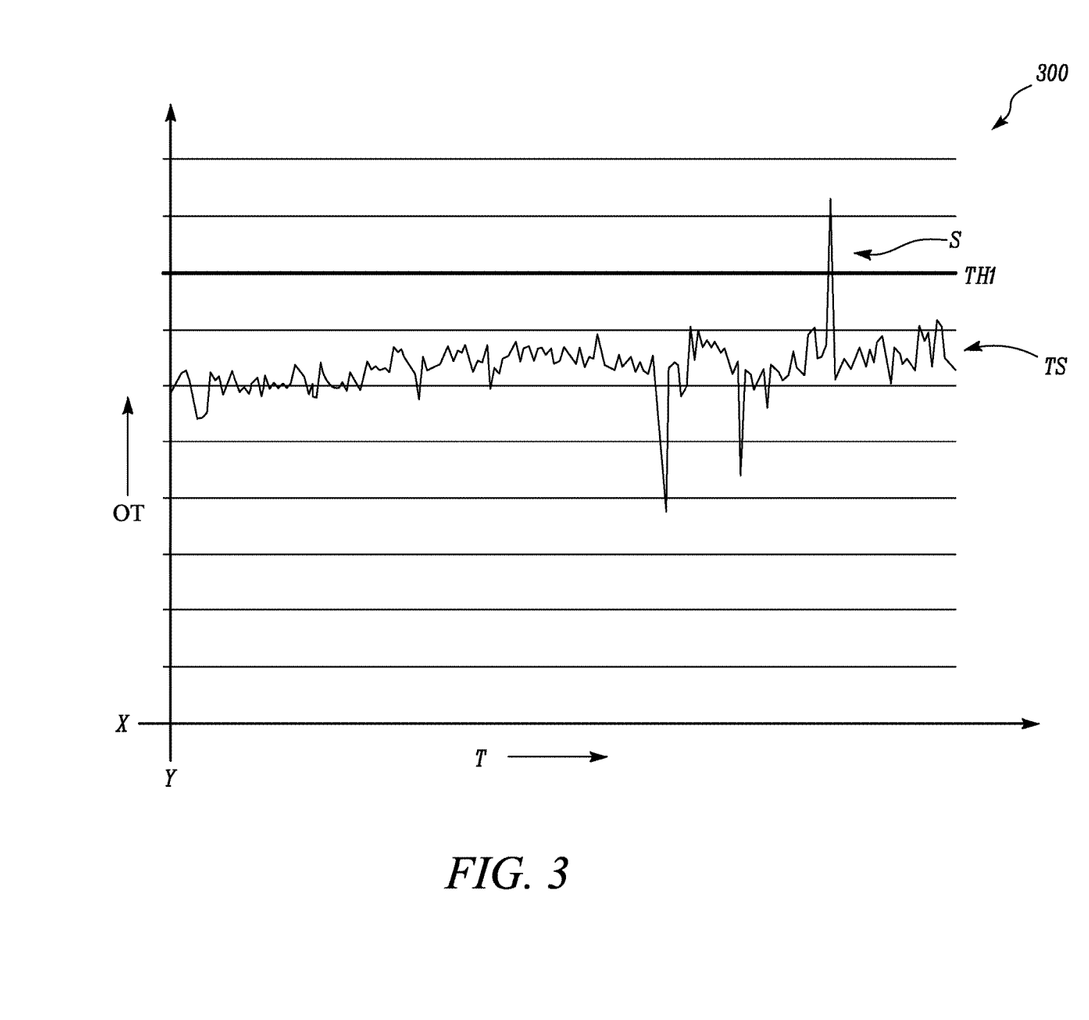

Referring to FIG. 3, a graph 300 showing another exemplary variation of the operating temperature "OT" of the component 102 over the predetermined time period "T" is illustrated. As shown, the operating temperature "OT" of the component 102 includes a single instance of a sudden spike "S" which is higher than the first predetermined threshold "TH1". Further, the operating temperature "OT" of the component 102 is lower than the first predetermined threshold "TH1" for a majority of the predetermined time period "T" prior to as well as after the single instance of the sudden spike "S". Also, the rate of change of the monitored operating temperature "OT" (not shown) over the predetermined time period "T" is lower than the second predetermined threshold "TH2" (not shown). In such a situation, the controller 106 is configured to determine the healthy status of the component 102.

Figure 4:
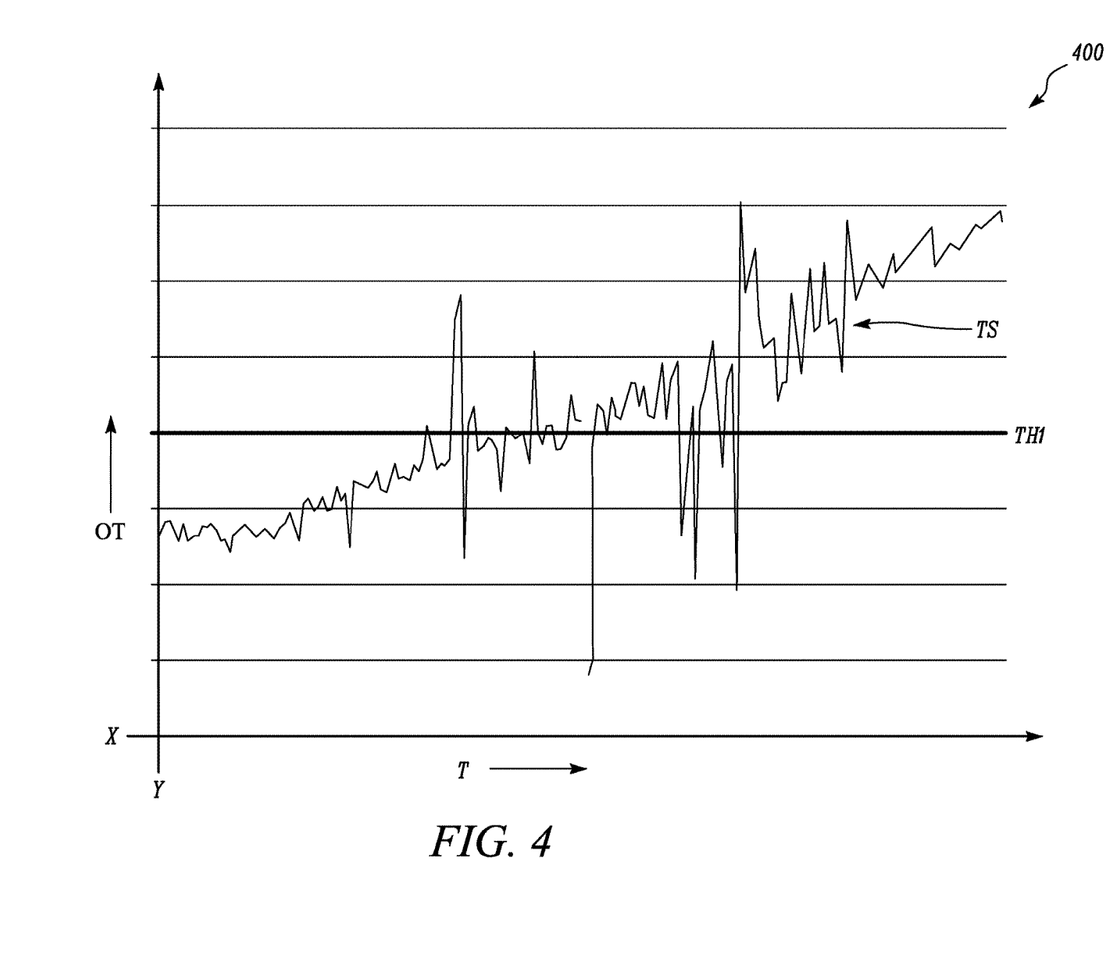

Referring to FIG. 4, a graph 400 showing yet another exemplary variation of the operating temperature "OT" of the component 102 over the predetermined time period "T" is illustrated. As shown, the operating temperature "OT" of the component 102 varies over the predetermined time period "T". More specifically, the operating temperature "OT" of the component 102 gradually increases over the predetermined time period "T" and crosses the first predetermined threshold "TH1". Also, the rate of change of the monitored operating temperature "OT" (not shown) over the predetermined time period "T" may be approximately equal or higher than the second predetermined threshold "TH2" (not shown). In such a situation, as the operating temperature "OT" and the rate of change of the operating temperature "OT" exceeds the first and second predetermined thresholds "TH1", "TH2" respectively, the controller 106 is configured to determine a failure status of the component 102.

In another embodiment (not shown), the operating temperature "OT" of the component 102 over the predetermined time period "T" may vary such that the operating temperature "OT" may gradually increase but may be lower or approximately equal to the first predetermined threshold "TH1". Also, the rate of change of the monitored operating temperature "OT" over the predetermined time period "T" may be approximately equal to or higher than the second predetermined threshold "TH2". In such a situation, the controller 106 is configured to determine an impending failure status of the component 102.

In yet another embodiment (not shown), the operating temperature "OT" of the component 102 over the predetermined time period "T" may be approximately equal to or higher than the first predetermined threshold "TH1". However, the rate of change of the monitored operating temperature "OT" over the predetermined time period "T" may be approximately zero or negligible and the operating temperature "OT" of the component 102 is maintained higher than the first predetermined threshold "TH1". In such a situation, the controller 106 is configured to determine the failure status of the component 102.

The controller 106 is also configured to provide a notification to the operator indicative of the determined status of the health of the component 102. Accordingly, the controller 106 is communicably coupled to an output device 110. The output device 110 may include a monitor, a screen, a display panel, a speaker, a light source, and so on. The output device 110 is configured to provide the notification to the operator. In one embodiment, the notification may be a text message and/or an email including numerical, alphabetical, alphanumerical and/or special characters. In another embodiment, the notification may be an audible message, a visual indication in form of glowing of the light source or display of specific icons on the output device 110 or a combination of similar such other notifications.

The controller 106 may be configured to compensate for changes in the ambient temperature. For example, in one embodiment, where the means for generating the temperature signal "TS" may include the first and second temperature sensors and the ambient temperature may be low, the first temperature signal may be generally low due to the low ambient temperature. As a result, the difference between the first and second temperature signals may be higher than the first predetermined threshold "TH1". Accordingly, the controller 106 may be configured to compensate for the lower first temperature signal and/or may increase the first predetermined threshold "TH1" in order to compensate for or take into consideration other factors that may have an effect on the temperature signal "TS".

In another embodiment, where the means for generating the temperature signal "TS" may include the first and second temperature sensors and the ambient temperature may be high, the first temperature signal may be generally high due to the high ambient temperature. As a result, the difference between the first and second temperature signals may be lower than the first predetermined threshold "TH1". Accordingly, the controller 106 may be configured to compensate for the higher first temperature signal and/or may lower the first predetermined threshold "TH1". The controller 106 may be configured to compensate for changes in the type of fuel. Different fuels may have different physical properties such as viscosity, specific heat and so on. Thus, when the type of fuel may change, the operating temperature "OT" may change accordingly. In one embodiment, the operating temperature "OT" of the component 102 may increase due to the change in the type of fuel. Accordingly, the operating temperature "OT" of the component 102 may be higher than the first predetermined threshold "TH1" even when the component 102 may be healthy.

In another embodiment, the operating temperature "OT" of the component 102 may reduce due to the change in the type of fuel. Accordingly, the operating temperature "OT" of the component 102 may be lower than the first predetermined threshold "TH1" even when the component 102 may have already failed or may be failing. The controller 106 may be configured to increase or decrease the first predetermined threshold "TH1" based on the type of fuel.

The controller 106 may also be configured to compensate for changes in the level of fuel in the tank. The tank may receive unused fuel from different components of the machine which may generally be at elevated temperatures. During a low fuel level condition in the tank, the returning unused fuel at elevated temperatures may mix with the fuel present in the tank. This may lead to an overall increase in a temperature of the fuel within the tank.

In the embodiment where the means for generating the temperature signal "TS" may include the first and second temperature sensors, the increased temperature of the fuel in the tank may represent the first temperature signal. As a result, the difference between the first and second temperature signals may be lower than the first predetermined threshold "TH1". Accordingly, the controller 106 may be configured to compensate for the higher first temperature signal and/or may lower the first predetermined threshold "TH1" based on the fuel level condition in the tank. The above mentioned factors are exemplary and may vary based on the component 102 and/or application. Further, the factors disclosed herein do not limit the scope of the present disclosure.

INDUSTRIAL APPLICABILITY

Figure 5:
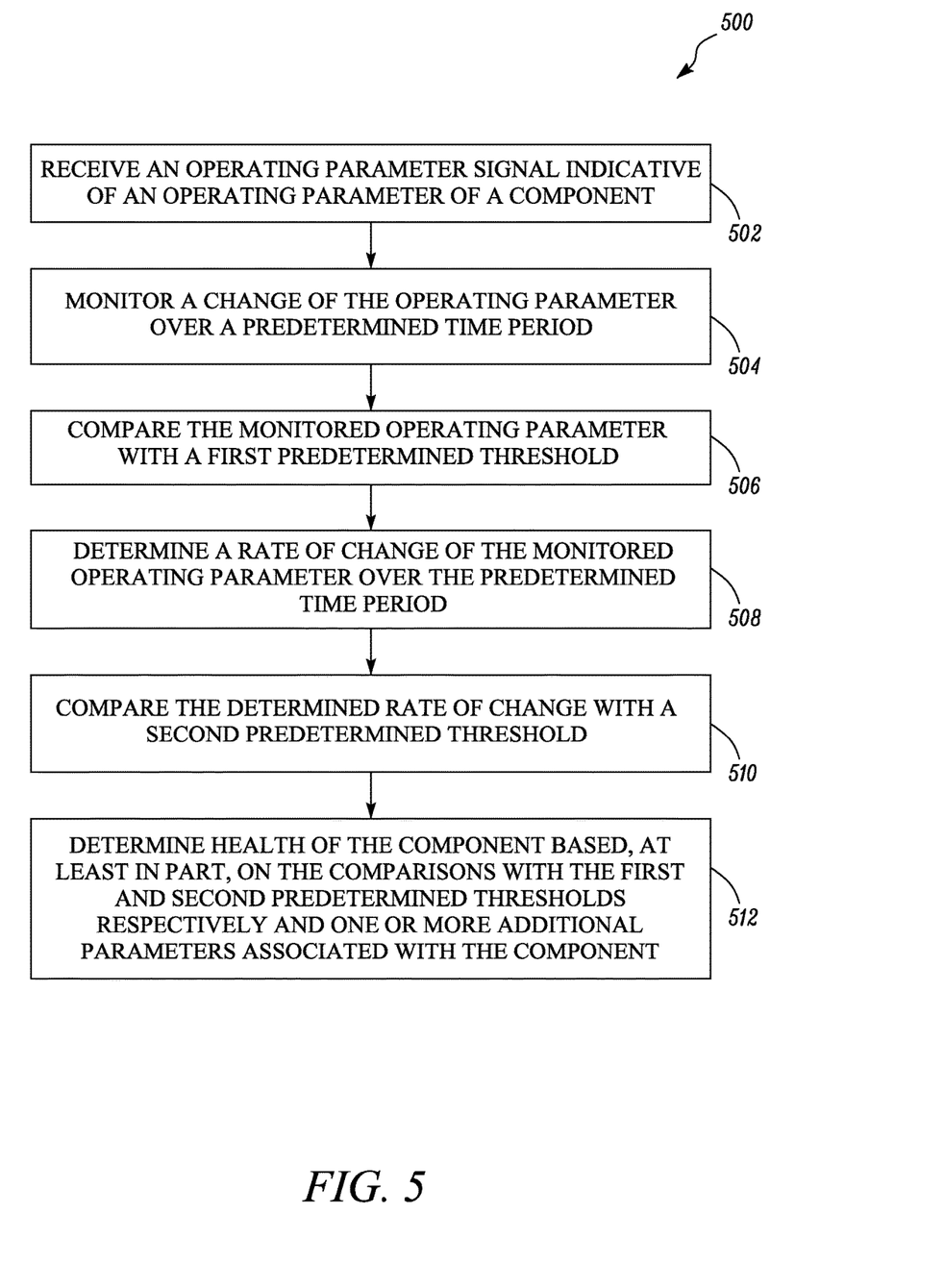
FIG. 5 is a flowchart of a method of working of the health determination system.

The present disclosure relates to a method 500 for determining the health of the component 102. Referring to FIG. 5, a flowchart of working of the health determination system 100 is illustrated. At step 502, the controller 106 receives the operating parameter signal indicative of the operating parameter of the component 102. More specifically, the controller 106 receives the temperature signal "TS" indicative of the operating temperature "OT" of the component 102. At step 504, the controller 106 monitors the change of the operating parameter over the predetermined time period "T". More specifically, the controller 106 monitors the change of the operating temperature "OT" over the predetermined time period "T". At step 506, the controller 106 compares the monitored operating parameter with the first predetermined threshold "TH1". More specifically, the controller 106 compares the monitored operating temperature "OT" with the first predetermined threshold "TH1". At step 508, the controller 106 determines the rate of change of the monitored operating parameter over the predetermined time period "T". More specifically, the controller 106 determines the rate of change of the monitored operating temperature "OT" over the predetermined time period "T". At step 510, the controller 106 compares the determined rate of change with the second predetermined threshold "TH2".

In the embodiment where the means for generating the temperature signal "TS" includes the first and second temperature sensors, the controller 106 may receive the first and second temperature signals indicative of the operating temperature "OT" of the inlet and the outlet of the component 102 respectively. The controller 106 monitors the difference between the first and second temperature signals over the predetermined time period "T". The controller 106 then compares the difference between the first and second temperature signals with the first predetermined threshold "TH1". The controller 106 then determines the rate of change of the difference between the first and second temperature signals over the predetermined time period "T". The controller 106 compares the determined rate of change of the difference between the first and second temperature signals with the second predetermined threshold "TH2".

At step 512, the controller 106 determines the health of the component 102 based, at least in part, on the comparisons with the first and second predetermined thresholds "TH1", "TH2" respectively and the one or more additional parameters associated with the component 102. In case of the fuel pump, the one or more additional parameters include at least one of the level of fuel in the tank, the ambient temperature and the type of fuel. Based on the comparison and/or status of exceeding the first and second predetermined thresholds "TH1", "TH2", the controller 106 determines the healthy, impending failure or failure status of the component 102. Further, the controller 106 may provide the notification to the operator indicative of the determined health of the component 102 through the output device 110.

The health determination system 100 and the method 500 disclosed herein may be used to determine the impending failure of the component 102 based on the monitoring of the operating temperature "OT" of the component 102 itself. Further, the system 100 may also take into consideration, the behavior of the component 102 over the predetermined time period "T" thereby providing an accurate diagnosis wherein an anomalous behavior of the component 102 will not affect the overall health determined by the system 100. Additionally, the system 100 allows flexibility by considering the other additional parameters, such as, the ambient conditions, and so on, in order to accurately determine the health of the component 102.

In a further embodiment, the health determination system 100 may embody a monitoring and notification system and analyze data from one or more sensors to determine whether a first condition has occurred and, upon meeting the first condition, analyze the same data, additional data from the same sensors, and/or other data from other sensors to determine whether a second condition has occurred. Upon the occurrence of both the first and second conditions, a notification may be generated. In one embodiment, the health determination system 100 may be operative to monitor data indicative of temperatures associated with the component 102, such as a high-pressure fuel pump, to determine an impending pump failure based upon the occurrence of the first and second conditions.

The controller 106 may monitor different types of data associated with the fuel pump to determine an impending pump failure and, thus, provide advance notice so that a replacement fuel pump may be ordered and/or installed prior to a failure. In an embodiment, the controller 106 may receive and store data such as a first temperature signal from a first temperature sensor associated with the fuel pump indicative of an operating temperature of the inlet to the fuel pump and a second temperature signal from a second temperature sensor associated with the fuel pump indicative of an operating temperature of the outlet from the fuel pump. The data may be stored within or accessed by the controller 106, as desired.

In one embodiment, the first and second conditions may be based upon the daily average of the temperature difference between the inlet temperature based upon first temperature signals from the first temperature sensor and the outlet temperature based upon second temperature signals from the second temperature sensor. For example, the first condition may be a temperature difference between the inlet and outlet over a first time period and the second condition may be a temperature difference characteristic between the inlet and outlet over a second time period. The first and second time periods may be the same length of time or different lengths of time. In addition, the first and/or second conditions may be based upon other types of signals or data, if desired.

To determine the daily average temperature difference, the first temperature signals from the first temperature sensor and the second temperature signals from the second temperature sensor may be monitored and stored by the controller 106 during the operation of the fuel pump. In one embodiment, the temperature signals may be stored once every second. The controller 106 may determine a daily average first temperature at the first temperature sensor based upon the first temperature signals and determine a daily average second temperature at the second temperature sensor based on the second temperature signals. The controller 106 may then determine the daily average temperature difference by subtracting the daily average first temperature from the daily average second temperature. Other manners of determining the daily average temperature difference are contemplated. For example, the difference between the inlet temperature and the outlet temperature may be periodically determined during each day.

A first temperature difference threshold such as a daily average threshold associated with the first condition may be set, stored, and/or accessed by controller 106. In one example, the daily average threshold may be approximately 40° C. Other daily average thresholds may be used, as desired. Upon determining the daily average temperature difference, the controller 106 may compare the daily average temperature difference to the daily average threshold. The first condition will be met if the daily average temperature difference exceeds the daily average threshold.

Upon meeting the first condition, the controller 106 may monitor the temperature data to determine whether one or more second conditions have been met. In an embodiment, the second condition may be based upon additional characteristics of the daily average temperature difference between the first temperature sensor and the second temperature sensor. For example, a second temperature difference characteristic of the temperature data may be compared to a second temperature difference threshold. In one example, the second condition may be met if the daily average temperature difference increases over time. For example, the second condition may be met if the daily average temperature difference increases each day over a threshold number of consecutive days. Such a continuous increase in daily average temperature difference may be indicative of an imminent failure of the fuel pump and an appropriate notification command or alert signal may be generated. In an example, the threshold number of consecutive days for a temperature increase may be set at approximately three days. Other consecutive day thresholds may be used, as desired.

In another embodiment, the second condition may be met if the daily average temperature difference is generally increasing, but such increase is not consistent or does not occur over a sufficient number of consecutive days to meet the condition described above. To determine such a general increase in daily average temperature difference, the slope of the temperature difference, such as the daily average temperature difference, over a predetermined time threshold such as a predetermined number of consecutive days may be compared to a slope threshold. The slope of the daily average temperature difference over the time threshold exceeding the slope threshold may be indicative of an imminent failure of the fuel pump and an appropriate notification command or alert signal may be generated. In an example, the time threshold may be set at approximately thirty days and the slope threshold may be set at approximately 0.1° C. In another example, the time threshold may be at least 25 days. If desired, the slope threshold may be higher (e.g., greater than 0.1° C.) if the time threshold is reduced (e.g., 25 days). Other time thresholds and other slope thresholds may be used, as desired.

Although time periods are referred to herein in terms of days, such time periods may alternatively be expressed in any unit of time such as hours. In addition, a specified number of hours (e.g., eight hours) of operation or data may be required to qualify as a day of operation or a day of data. The notification command or signal may take any desired form and may include notifying desired personnel, checking the availability of a replacement fuel pump, and/or ordering a replacement fuel pump, if desired.

Although described in the context of using first and second temperature sensors directly measuring temperatures at the inlet and outlet of the fuel pump, in another embodiment, the first and/or second temperature sensors may be moved so that they are not measuring the temperature at the inlet and/or outlet of the fuel pump. For example, in some instances, a temperature may be measured at one location that reflects, indicates, or may be used to calculate the temperature at another location. In still another embodiment, one or both of the first and second temperature sensors may be omitted and the first and/or second data generated by other sensors. The first and/or second data reflects, indicates, or may be used to calculate a temperature associated with the component (e.g., the fuel pump) without directly measuring the temperature. In such case, the first and/or second temperatures may be derived, calculated, or otherwise determined based upon the data from the other sensor or sensors.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for determining health of a fuel pump, the fuel pump having an inlet and an outlet, the system comprising:
    a first temperature sensor associated with the fuel pump, the first temperature senor configured to generate first temperature signal indicative of a temperature adjacent the inlet of the fuel pump;
    a second temperature sensor associated with the fuel pump, the second temperature sensor configured to generate a second temperature signal indicative of the temperature adjacent the outlet of the fuel pump; and
    a controller in communication with the first and second temperature sensors, the controller configured to
       receive the first temperature signal from the first temperature sensor;
       receive the second temperature signal from the second temperature sensor;
       monitor a difference in the temperature between the first and second temperature sensors over a predetermined time period;
       compare the difference in the temperature to with a first predetermined threshold;
       determine a rate of change of the difference in the temperature over the predetermined time period;
       compare the determined rate of change of the difference in the temperature with a second predetermined threshold;
       determine the health of the fuel pump based, at least in part, on the comparisons with the first and second predetermined thresholds respectively and one or more additional parameters associated with the fuel pump; and
       generate a notification indicative of the determined health of the fuel pump.

2. The system of claim 1, wherein the controller is further configured to determine a failure of the fuel pump based on exceeding the first and second predetermined thresholds respectively.

3. The system of claim 1 further comprising:
    an output device communicably coupled to the controller.

4. The system of claim 3, wherein the output device includes at least one of a monitor, a screen, a display panel and a speaker.

5. The system of claim 1, wherein the one or more additional parameters include at least one of a level of fuel in a tank, an ambient temperature and a type of fuel.

6. A method for determining health of a fuel pump, the fuel pump having an inlet and an outlet, the method comprising:
    receiving a first temperature signal from a first temperature sensor indicative of a temperature adjacent the inlet of the fuel pump;
    receiving a second temperature signal from a second temperature sensor indicative of a temperature adjacent the outlet of the fuel pump;
    monitoring a difference in the temperature between the first and second temperature sensors over a predetermined time period;
    comparing the difference in temperature with a first predetermined threshold;
    determining a rate of change of the difference in temperature over the predetermined time period;
    comparing the determined rate of change in the difference in temperature with a second predetermined threshold;
    determining the health of the fuel pump based, at least in part, on the comparisons with the first and second predetermined thresholds respectively and one or more additional parameters associated with the fuel pump; and
    generating a notification indicative of the determined health of the fuel pump.

7. The method of claim 6, wherein the one or more additional parameters include at least one of a level of fuel in a tank, an ambient temperature and a type of fuel.

8. The method of claim 6, wherein determining the health of the fuel pump further comprises:
    determining a failure of the fuel pump based on exceeding the first and second predetermined thresholds respectively.

9. The method of claim 6, wherein receiving the operating parameter signal further comprises:
    receiving a first operating parameter signal indicative of an operating parameter of an inlet of the fuel pump; and
    receiving a second operating parameter signal indicative of an operating parameter of an outlet of the fuel pump.

10. A monitoring and notification system for a fuel pump, the system comprising:
    a first sensor associated with the fuel pump configured to generate first signals indicative of an inlet temperature of the fuel pump;
    a second sensor associated with the fuel pump configured to generate second signals indicative of an outlet temperature of the fuel pump, and
    a controller in communication with the first sensor and the second sensor, the controller configured to:
       access a first temperature difference threshold;
       access a second temperature difference threshold;
       receive the first signals from the first sensor;
       receive the second signals from the second sensor;
       determine a first temperature difference between the first sensor and the second sensor based upon the first signals and the second signals over a first predetermined time period;
       compare the first temperature difference with the first temperature difference threshold;
       upon the first temperature difference exceeding the first temperature difference threshold,
       determine a temperature difference characteristic of the first temperature difference based upon the first signals and the second signals over a second predetermined time period;
       compare the temperature difference characteristic with the second temperature difference threshold; and
       generate an alert signal when the second average temperature difference characteristic exceeds the second temperature difference threshold.

11. The monitoring and notification system of claim 10, wherein the first temperature difference is a daily average temperature difference between the inlet temperature and the outlet temperature.

12. The monitoring and notification system of claim 10, wherein the second temperature difference characteristic is a plurality of consecutive days of increasing daily average temperature difference between the inlet temperature and the outlet temperature.

13. The monitoring and notification system of claim 10, wherein the second temperature difference characteristic is a slope of an average temperature difference between the inlet temperature and the outlet temperature.

14. The monitoring and notification system of claim 13, wherein the second predetermined time period is at least 25 days.

15. The monitoring and notification system of claim 10, wherein the temperature difference characteristic corresponds to a plurality of consecutive days of increasing daily average temperature difference between the inlet temperature and the outlet temperature and the controller is further configured to:
   determine an additional temperature difference characteristic corresponding to a slope of an average temperature difference between the inlet, temperature and the outlet temperature;
   access a third temperature difference threshold; and
   generate an alert signal upon the first of:
      the temperature difference characteristic exceeding the second temperature difference threshold; and
      the additional temperature difference characteristic exceeding the third temperature difference threshold.

* * * * *